Oct. 6, 1936.     E. G. BUDD ET AL     2,056,563
SHEET METAL STRUCTURAL ELEMENT AND METHOD OF MAKING
Filed March 22, 1934
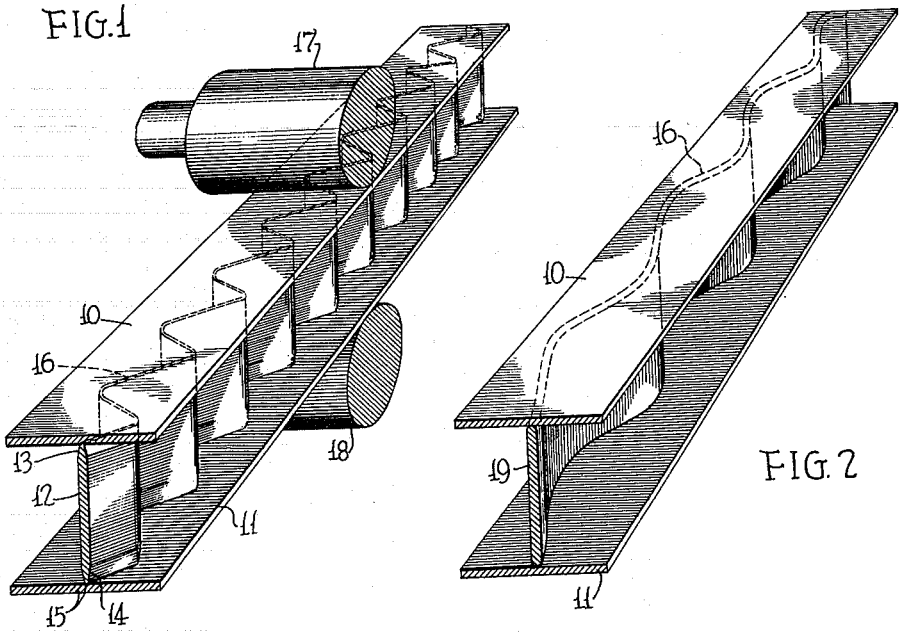
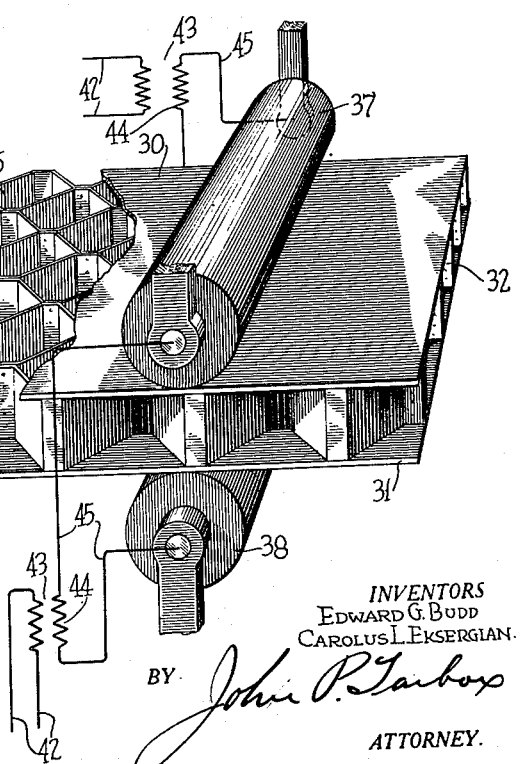
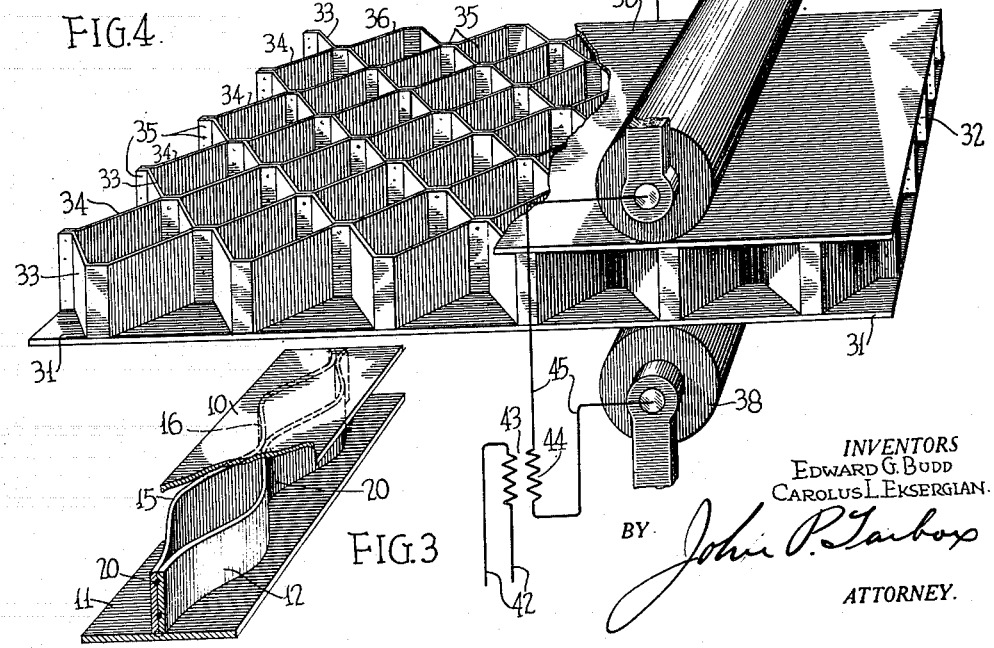
INVENTORS
EDWARD G. BUDD
CAROLUS L. EKSERGIAN
BY John P. Tarbox
ATTORNEY.

Patented Oct. 6, 1936

2,056,563

UNITED STATES PATENT OFFICE

2,056,563

SHEET METAL STRUCTURAL ELEMENT AND METHOD OF MAKING

Edward G. Budd, Philadelphia, Pa., and Carolus L. Eksergian, Detroit, Mich., assignors to Edward G. Budd Manufacturing Company, Philadelphia, Pa., a corporation of Pennsylvania Application March 22, 1934, Serial No. 716,834

4 Claims. (Cl. 219—10)

This invention relates to composite sheet metal structural elements and hollow insulating metallic structures and the processes of making the same and is adapted particularly for use in the manufacture of sheet metal beams, girders, columns, walls, doors and related structures, and is an improvement upon the subject matter a sole application of Edward G. Budd, of even date.

Objects of this invention are the attainment of structures of light weight, great strength and pleasing outward appearance, which are subject to production processes resulting in economies of material and equipment for manufacturing as well as elimination of operating steps in production. Among other objects of this invention may be enumerated the provision of a method of making a light weight, strong structural element, the making of structural elements from sheet metal, the development of a method of making the article suitable to production processes, the making of the article by continuous welding processes, the utilization of a plurality of welding devices in cooperative relation, etc.

In the construction of sheet metal walls, partitions, doors, etc., it has been the common practice to provide a pair of parallel sheet metal outer members of desired shape, for the surface pieces, and various shaped metallic members interposed between these outer sheets and provided with projections at intervals and welded together, among which interposed members have been channel-shaped members and straight members utilizing tie or supporting pieces to maintain them in proper position during the assembly operations.

The present invention relates to the process of making such structures and to the structure itself, wherein the need of interposing mandrels during assembly operations is avoided, and whereby costly intermediate steps of providing auxiliary supporting structures to the spacing members during the assembly operations are similarly avoided. Other advantages of the invention will be more apparent from a reading of the following description.

The foregoing and other objects of this invention are attained by fabricating structural elements from sheet metal having spaced chord or surface members, and intervened sheet metal web devices, resistance welded to the flat faces of the chord portions along its length at intervals or continuously.

This invention will be better understood when considered in connection with the attached drawing and appended claims.

In Fig. 1 is illustrated in perspective a simple structural element incorporating features of this invention.

In Fig. 2 is illustrated a slight variation.

In Fig. 3 is a structural element having at least two web members.

In Fig. 4 a wall structure is illustrated in process of fabrication.

According to this invention structural elements having substantially the characteristics of beams, or columns, or girders are made of sheet metal, having chord members spaced apart and interconnected by intervened web members of sheet metal which are resistance welded along their edges per se to the chords or flanges or surface members. These intervened members are preferably of substantially undulating or serpentine form for reasons herein set forth. In Figure 1 the upper and lower chord or flange members comprising the parts 10 and 11 respectively, are made of sheet metal and are spaced apart by the intervening element 12 comprising a web or spacing device, likewise of sheet metal. The element 12 is of reduced gauge at 13 and 14 adjacent the edges per se 15. This tapered gauge area insures concentration of welding current in localized zones providing uniformity in strength of securement. Before the welding operation per se the edges of the web member are contoured to the inner surfaces of the chord members, so that a continuous seam or resistance weld 16 fastens the chord and web during the relative continuous motion of the elemental parts between the rolls 17 and 18 during the welding operation. Figure 2 shows a similar structural element having corresponding elemental portions, having a slightly varied form of edge reduction in gauge adjacent to the edge per se, as clearly seen in the cross-section of the web portion 19.

In these particular forms the weld 16 is substantially sinusoidal in space configuration. It is readily apparent from the disclosure so far that a continuous line of uniform fusion occurs between the elemental parts without substantially marring the surface contour and eliminating incidental steps of the making of spuds on the parts.

In Figure 3 is found a perspective of a short section of a structural element involving a plurality of web portions welded to the chord members in a similar manner having seam resistance weld joints and having the corrugations of the web members 12 welded together as at 20, by spud, spot or other resistance welds, where the peaks of the bends of the undulations or serpentine contour are juxtaposed together and preferably connected. This form of construction provides a definite strength-giving character to the web as well as pre-determining the spaced relation of the chord parts and results in a structural element of great strength.

The method of fabricating the structural elements involves the positioning of a web member between substantially coextensive chord elemental portions contouring the parts for cooperation, tapering or changing the gauge of the web portion substantially along its peripheral edges and progressively electrically welding the parts by resistance welding. Other factors entering in the method involve the pre-shaping of the margin of the web adjacent the edge per se to concentrate the initial welding current during the progressive welding operations and providing the web with a linear form complemental to the inner surface of the chord members. Additionally the method may include the structural elements with one or a plurality of web members upon which the operative steps have been utilized individually as far as assembly is concerned, and preferably collectively as to the joining or welding operations per se. The relative movement of the roller electrodes and work parts is such that the effective welding current passes between the rollers during their position of tangency to the parts, from one roller through an adjacent chord portion, a web or a plurality of web elements, the chord element at the opposite side, to the other roller. Continuous application of welding energy may be utilized, or interrupted or pulsating impulses of energy coordinately with motion of the roller electrodes so that a continuous uniform seam weld or resistance weld results.

In Fig. 4 a structural panel or wall element is shown involving upper and lower surface sheets 30 and 31 with an intervened spacing device 32 comprising a plurality of substantially sinusoidal or undulating members 33 and 34 secured to each other preferably by welds or other means in the areas 35, and to the corresponding outer members by resistance welds along the edges 36. The drawing illustrates schematically one form of welding apparatus comprising upper and lower roller electrodes 37 and 38 respectively, positioned at either side of the work and in engagement with the flat surfaces of the outer chord or wall sheets and at the opposite sides thereof from the contact zone thereof with the web members 32. The axial extent of the electrode rollers is such that continuous production of relatively large structural elemental areas is accomplished in a continuous process. This provides application of pressure with a consequent distribution resulting in a uniform pressure application throughout the work pieces. For purposes of equalization of electrical energy the rolls may have one or a plurality of power sources as schematically shown in the figure. One such source 42 operates through a transformer 43, the secondary 44 of which is connected by leads 45 to the two electrode rolls. A similar such power supply may be electrically connected with the rolls at their opposite extremities, and if the apparatus requires additional terminal points for uniform distribution, further terminals may be provided. The essential requirement of the electrical connections being that the transformer secondaries are connected to the electrode rollers in such manner that the polarities and the circuit path of the current is through the work with respect to each transformer secondary and not through an adjacent transformer. This arrangement is capable of providing high current densities and accurate application thereof to the work parts in a manner to insure adequate and proper welds. Although not specifically indicated in the drawing, suitable control apparatus is provided in the primary circuits of the welding transformers somewhere between the leads 42 and the primary source of electrical energy to which the apparatus is arranged to be connected. This control equipment may be of any proper form, for example, high speed synchronous rotary switching apparatus, tube controlled circuits, induction regulator controlled equipments or any other suitable control apparatus.

The welding used herein is to be distinguished from spud welding as carried out in a copending application. The steps used herein are not provided with spuds. The welding is characterized by the progression development of lines of metal contact resistance conforming to the transverse dimensions of the main body of the strip as distinguished from initial contact resistance localized through spuds disconforming to such dimensions of the main body.

Although a particular embodiment and particular structures have been shown, the invention in its generic form and spirit is subject to modification, and the hereto appended claims are to be construed in the light of its novel concept.

What we claim is:

1. As an article of manufacture a composite sheet metal structural element having the characteristics of a beam or column comprising a chord member of sheet metal and a web member of sheet metal of undulatory form in the direction of its length connected edgewise with the chord member and resistance welded thereto at its edges per se continuously along lines of initial contact.

2. The method of producing a structural element in which a web member and the flat face of the chord member is resistance welded to the edge per se of the web member which comprises imparting to the web member an undulating form in the direction of its length adjusting the edge per se of the web member to the surface contour of the chord member to support the latter in the plane of the undulating edge of the web member and progressively resistance welding the said face to the said edge per se by roller welding, applying the roller to the opposite face of the chord member, passing the welding current from edge to edge of the web and through the thickness of the chord.

3. The method of producing a structural element in which the flat face of the chord members is resistance welded to the edges per se of the web members and in which a plurality of web members is utilized which comprises imparting to the web members an undulating form in the direction of their length adjusting the edge per se of the web members to support the latter in the plane of the undulating edges of the members to the surface contour of the chord members and progressively continuously resistance welding the said chord faces to the said web edges per se by roller welding, applying the rollers to the opposite faces of the chord members, and engaging the roller welding electrodes with the work in lines of their tangency simultaneously over an expanse including the plurality of web members and passing the electric current from the chords to the webs simultaneously through the plurality whereby the progressive and continuous welding operation is simultaneously achieved throughout the plurality.

4. The method of welding building structures according to claim 3 in which the plurality of webs are simultaneously resistance welded to a chord member which consists in feeding the current to the progressing line of simultaneous welding at a plurality of points whereby to unify the distribution of current between the several webs being simultaneously welded in place.

EDWARD G. BUDD.
CAROLUS L. EKSERGIAN.